United States Patent [19]

Barraza et al.

[11] Patent Number: 5,652,796
[45] Date of Patent: Jul. 29, 1997

[54] DATA ENCRYPTION CONTROL SYSTEM

[75] Inventors: Thomas F. Barraza, Milford; Young W. Lee, Orange; Sungwon Moh, Wilton; Arno Muller, Westport, all of Conn.

[73] Assignee: Pitney Bowes Inc., Stamford, Conn.

[21] Appl. No.: 264,082

[22] Filed: Jun. 21, 1994

[51] Int. Cl.⁶ .................... H04L 9/06; H04L 9/00
[52] U.S. Cl. .................. 380/29; 380/37; 380/43; 380/49; 380/50
[58] Field of Search ................. 380/29, 49, 9, 380/28, 50, 37, 43

[56] References Cited

U.S. PATENT DOCUMENTS 5,333,198  7/1994  Houlberg et al. .................. 380/49

*Primary Examiner*—Bernarr E. Gregory
*Attorney, Agent, or Firm*—Angelo N. Chaclas; Melvin J. Scolnick

[57] ABSTRACT

The data encryption system includes a first stage and a second stage data encryption engine in combination with a micro control system. The data encryption system is responsive to control signals from the micro control system. The first stage is comprised of an 8-bit bus input and output from the first stage to the second stage data encryption engine of 64-bits. The input bus of the first stage is gated to a plurality of 8-bit registers through a plurality of AND gates having a respective one of the AND gate inputs in communication with the 8-bit bus and output from the respective AND gate directed to a respective input of the respective 8-bit registers for selectively gating data from the 8-bit bus to respective ones of the 8-bit registers. A demultiplexer includes a plurality of inputs and a plurality of outputs, a respective output of the demultiplexer being in communication with the input of a respective one of the AND gates for selectively enabling a respective one of the AND gate in response to the state of the control signals.

14 Claims, 2 Drawing Sheets

DATA ENCRYPTION CONTROL SYSTEM

BACKGROUND OF THE INVENTION

The present invention relates to a data encryption system and, more particularly, to a data encryption system for a micro control system.

It is known to utilize data encryption in a variety of postal funds and other systems. The algorithm for data encryption may be represented by a standard such as, the Data Encryption Standard, United States Federal Information Processing Standards Publication 46, dated Jan. 15, 1977. The Data Encryption Standard (DES) describes a data encryption algorithm for implementation in special purpose electronic devices, such as electronic postage metering devices. The algorithm is designed to encipher and decipher blocks of data comprised of 64 bits under the control of a 64-bit key. Deciphering is accomplished by using the same key as for enciphering, but with the schedule of addressing the key bit altered so that the deciphering process is the reverse of the enciphering process.

SUMMARY OF THE INVENTION

It is an objective of the present invention to present a data encryption module for performing data encryption in accordance with a N-bit data encryption algorithm which is particularly suited for use in combination with a M-bit data bus wherein M is less than N.

It is a further objective of the present invention to present a data encryption module for performing data encryption in accordance with the data encryption algorithm as specified in the Data Encryption Standard, United States Federal Information Processing Standards Publication 46, dated Jan. 15, 1977.

It is a still further objective of the present invention to present a data encryption module for performing data encryption in accordance with the data encryption algorithm as specified in the Data Encryption Standard, United States Federal Information Processing Standards Publication 46, dated Jan. 15, 1977 wherein the data encryption algorithm is a 64-bit algorithm and the source data is presented in sequential 8-bit bytes.

It is a still further objective of the present invention to present a data encryption module as part of a micro control system wherein the data encryption module is one of a plurality of modules associated with a multi-function application specific integrated circuit (ASIC) having a 8-bit internal bus for performing data encryption in accordance with the data encryption algorithm as specified in Data Encryption Standard, United States Federal Information Processing Standards Publication 46, dated Jan. 15, 1977.

A micro control system particularly suited for controlling an electronic postage meter includes a microcontroller in bus communication with a number of memory units and an ASIC. The ASIC includes an address decoder which is responsible for providing the various control signals required by the functional modules of the ASIC. The ASIC also includes an 8-bit internal bus. One of the functional modules is a data encryption module (DES). The DES module is comprised of two stages. The first stage is intended to communicate with the 8-bit internal bus and in response to a sequence of 3-bit control signals from the address decoder which constructs a 64-bit message for delivery to the second stage which is a conventional data encryption engine. The first stage is comprised of eight (8) 8-bit registers in communication with the ASIC's internal bus through respective gates. The respective gates are responsive to the output of a 3–8 demultiplexer to enable the gates, one at a time, in any desired order in response to the sequence of 3-bit control signal from the address decoder. The first stage also includes means for latching the data in each register. The data is presented from the registers to a 64-bit accumulator where the parity is checked. Once the proper data parity is achieved, the data is forwarded to any suitable designed DES unit for encryption or decryption and the first stage is reset.

DETAILED DESCRIPTION OF THE PREFERRED EMBODIMENT

Figure 1:
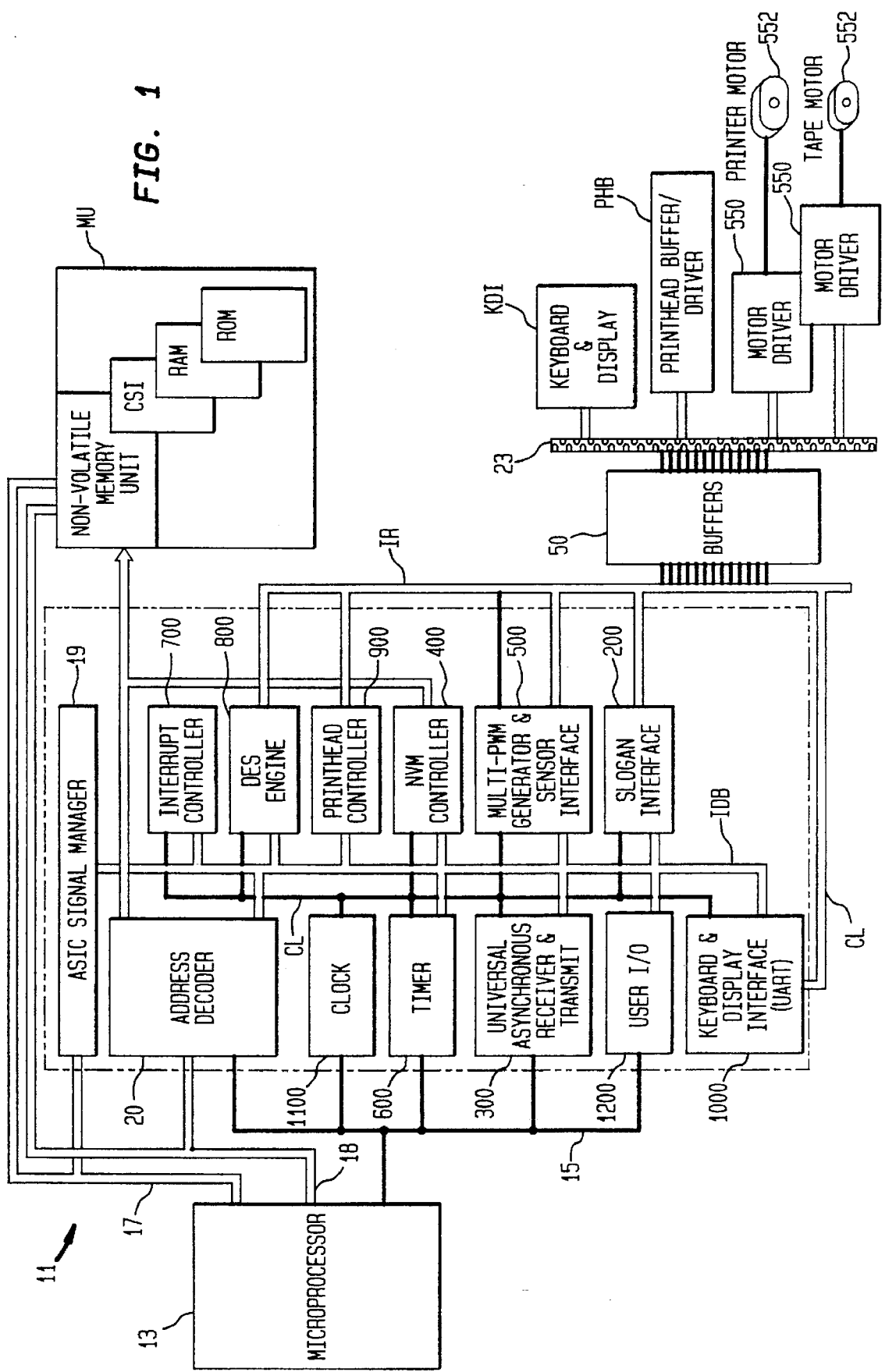
FIG. 1 is a schematic of a micro control system having a data encryption module in accordance with the present invention.

Referring to FIG. 1, a microprocessor control system, generally indicated as 11, which is preferably intended to control a thermal printing postage meter (not shown), is comprised of a microprocessor 13 in bus 17 and 18 communication with an application specific integrated circuit (ASIC) 15 and a plurality of memory units (MU). The ASIC 15 is comprised of a number of integrated circuits, for example, ASIC signal manager 19, address decoder 20, clock 1100, timer module 600, UART module 300, user I/O 1200, keyboard and display interface 1000, interrupt control 700, print head controller module 900, encryption and decryption (DES) engine 800, memory controller 400, multi-PWM generator and sensor interface 500 and a slogan interface 200. It should be appreciated that it is within the contemplation of the present invention that the IC modules which make up the ASIC 15 may vary and the modules here identified are intended to illustrate the preferred embodiment of the invention.

The ASIC has an internal data bus (IDB) and a plurality of control lines CL. Certain of the modules are in communication with a buffer 50 via the internal bus IB. The buffer 50 is in bus communication with a coupler 23. The coupler 23 is in communication with various meter devices, such as, the keyboard display KDI, print head buffer/driver PHB and motor drivers 550 which drive respective motors 552. In FIG. 1, the bus lines IDB and IB, and control lines CL are depicted in simplified manner for the purpose of clarity.

The control system address bus is received by the ASIC address decoder 20 which generates the necessary control signal on internal ASIC control bus CL for enabling the respective modules in accordance with the address instruction from the microprocessor 13. Low order data from the system data bus 17 is received by the interface 19 and placed on the internal data bus to be placed in the ASIC registers 8 when enabled by the address decoder in response to address instructions from the microprocessor. The data placed in the ASIC registers 8 are the operating parameters for the respective modules and accessed by the respective module during when the respective module has been enabled by the address decoder 20. A more complete description of the microprocessor control system is presented in U.S. patent application Ser. No. 08/163,629, entitled "Control System For An Electronic Postage Meter Having A Programmable Application Specific Integrated Circuit", filed Dec. 9, 1993, commonly assigned and herein incorporated by reference, now U.S. Pat. No. 5,552,991.

Figure 2:
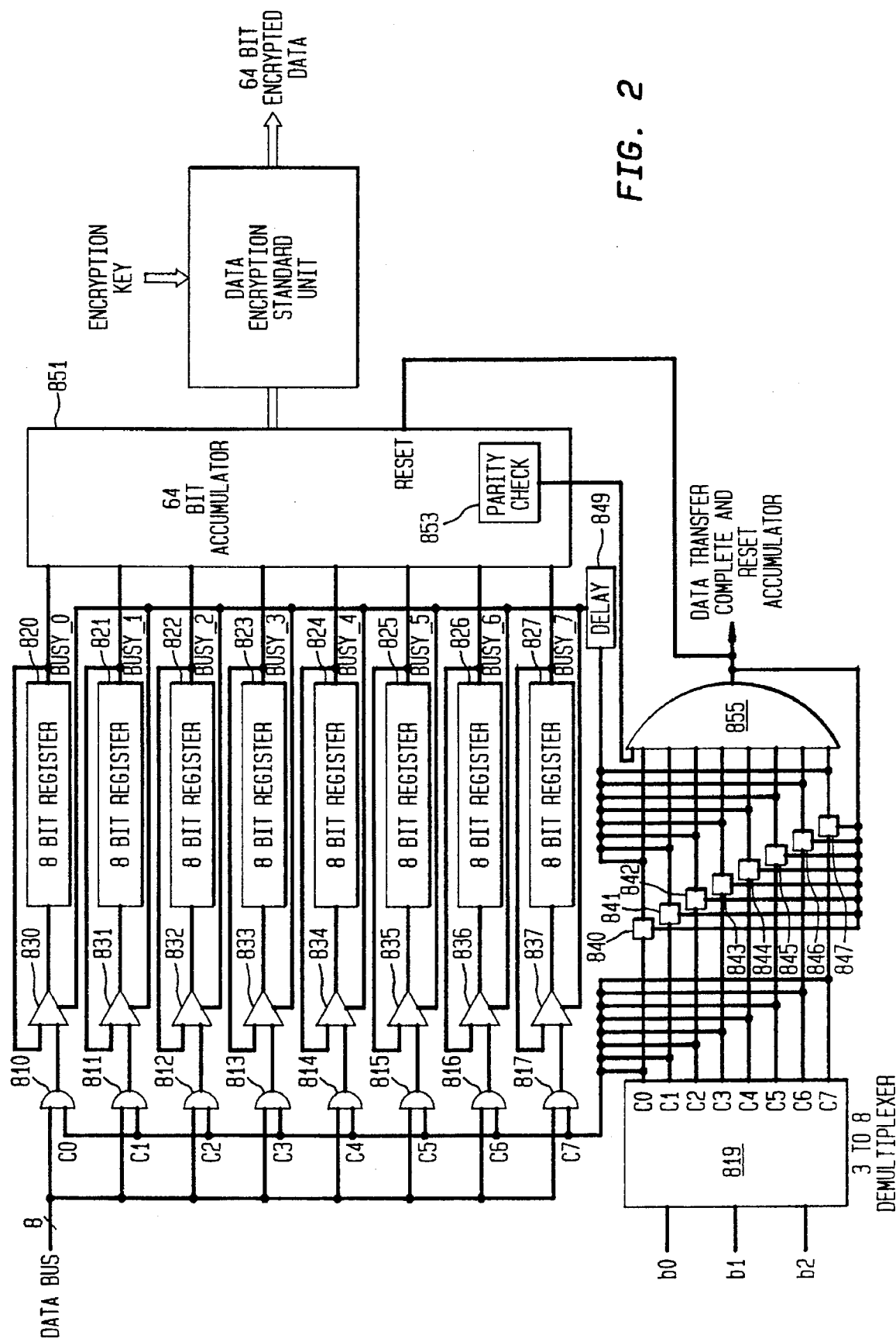
FIG. 2 is a schematic of the data encryption module in accordance with the present invention.

Referring to FIG. 2, the internal data bus is an 8-bit bus. The data bus is connected to each of a plurality of AND gates 810 through 817. A 3 to 8 demultiplexer 819 receives control signals (b0, b1, b2) from the address decoder 20 which enables output signals C0 through C7 in any desired order in response to sequential addressing of the address decoder 20 by the microprocessor 13. The output C0 to C7 is directed to the respective input of AND gates 810–817. By way of example, when the control signals (b0, b1, b2) is set to {0, 0, 0} the output signal C0 from the demultiplexer 819 goes active, the AND gate 810 is then enabled to permit the data from the data bus to be written to the 8-bit register 820 through a gate 830. Also, when the output signal C0 is enabled, a flip-flop 840 is enabled to output a signal, BUSY_0, which is directed to the gate 830 through a conventional delay circuit 849. The presence of the signal BUSY_0 at the gate 830 changes the state of gate 830 to block further data from the data bus causing stable registration of the data in the 8-bit register 820.

In like manner, to write data into register 820, the microprocessor sequentially places data on the data bus and addresses the address decoder 20 to cause the demultiplexer 819 to sequentially generate control signals C1–C7 enabling of AND gates 811–187 such that data is written to respective 8-bit registers 821–827 through the respective gates 831–837. In like manner, flip-flops 841–847 enables respective signals BUSY_1 to BUSY_7 to cause stable registration of the data in the respective 8-bit registers 821–287. Data registered in the 8-bit registers 820–827 is directed to an accumulator 851 which includes a conventional polarity check circuit 853 which outputs a signal to an AND gate 855 when 64 bits of data has been accumulated in the accumulator 851. The output from the polarity check circuit 853 also results in data being shifted out of the accumulator to the conventional data encryption standard unit for encryption in a conventional manner. The BUSY_0 to BUSY_7 signals and the output signal from the polarity check circuit 853 are directed to the AND gate 855 which outputs a data transfer and reset accumulator signal to the microprocessor when all the input signals are enabled. It is appreciated that the data key is identical to source data.

The above description represents the preferred embodiment of the present invention and should not be viewed as limiting. The scope of the present invention is presented by the appended claims.

What is claimed is:

1. An improved data encryption system having a second stage data encryption engine of N-bits data input in combination with a microcontrol system, wherein said data encryption system is in electrical communication with said microcontrol system for receiving control signals from said microcontrol system and wherein the improvement comprises a first stage including:

an M-bit bus input and an output from said first stage to said second stage data encryption engine of N-bits, wherein M is less than N but greater that 1;

register means for storing M-bits of input data at a time and accumulating N-bits of data therefrom; and means for sequentially enabling said register means for receiving M-bits of data at a time in response to control signals from said microcontrol system.

2. An improved data encryption system as claimed in claim 1 further comprising means for checking the parity of data accumulated in said register means and enabling data transfer to said second stage when the parity check is complete.

3. An improved data encryption system as claimed in claim 2 further comprising means for signaling said microcontrol system when said data accumulated in said first stage is transferred to said second stage and resetting said first stage to receive new data bits.

4. An improved data encryption system having a 64-bits second stage data encryption engine in combination with a microcontrol system, wherein said data encryption system is in electrical communication with said microcontrol system for receiving control signals from said microcontrol system and wherein the improvement comprises a first stage including:

an 8-bit bus input and 64-bits output from said first stage to said second stage data encryption engine;

a plurality of 8-bit registers;

a plurality of AND gates having a respective input in communication with said 8-bit bus and respective output from each of said AND gate directed to a respective input of one of said 8-bit registers for selectively gating data from said 8-bit bus to respective ones of said 8-bit registers;

a demultiplexer having a plurality of inputs and a plurality of outputs, a respective one of said outputs of said demultiplexer being in communication with said input of a respective one of said AND gates for selectively enabling a respective one of said AND gates in response to the state of said control signals.

5. An improved data encryption system as claimed in claim 2 further comprising means for latching data respectively into said respective registers subsequent to said data being written in said respective 8-bit register.

6. An improved data encryption system as claimed in claim 5 further comprising means for checking the parity of data accumulated in said registers and enabling data transfer to said second stage when the parity check is complete.

7. An improved data encryption system having a second stage data encryption engine of N-bits data input in combination with a microcontrol system, wherein said data encryption system is in electrical communication with said microcontrol system for receiving to control signals from said micro control system and wherein the improvement comprises a first stage including:

an M-bit bus input and an output from said first stage to said second stage data encryption engine of N-bits, wherein M is less than N but greater that 1;

register means for storing M-bits of input data at a time and accumulating N-bits of data wherein N=C×M; C=2, 4, 8, 64, 128, 256; and means for sequentially enabling said register means for receiving M-bits of data at a time in response to said control signals from said microcontrol system.

8. An improved data encryption system as claimed in claim 7 wherein said register means comprises:

a M-bit bus;

a plurality of M-bit registers;

a plurality of gate means having respective inputs in communication with said M-bit bus and respective output to a respective one of said M-bit registers for selectively gating data on said M-bit bus to respective ones of said M-bit registers in response to said control signals from said microcontrol system.

9. An improved data encryption system as claimed in claim 8 further comprising means for checking the parity of data accumulated in said register means and enabling data transfer to said second stage when the parity check is complete.

10. An improved data encryption system as claimed in claim 9 further comprising means for signaling said microcontrol system when said data accumulated in said first stage is transferred to said second stage and resetting said first stage.

11. An improved data encryption system as claimed in claim 10 wherein said microcontrol system is comprised of a programmable microprocessor in bus communication with a plurality of memory units and an ASIC wherein said improved data encryption system is one of a plurality of modules of said ASIC, said ASIC having an address decoder module means for generating said control signal in response to an address generated by said microprocessor whereby data then placed on said data bus by said microprocessor is written to said register which has been enabled by said control signal.

12. An improved data encryption system as claimed in claim 7 further comprising means for latching said data into said respective M-bit registers subsequent to said data being written in said respective M-bit registers.

13. An improved data encryption system as claimed in claim 7 further comprising means for checking the parity of data accumulated in said register means and enabling data transfer to said second stage when the parity check is complete.

14. An improved data encryption system as claimed in claim 13 further comprising means for signaling said microcontrol system when said data accumulated in said first stage is transferred to said second stage and resetting said first stage.

* * * * *